United States Patent

Lindback et al.

[15] 3,651,263

[45] Mar. 21, 1972

[54] METHOD FOR SYNCHRONIZING DIGITAL SIGNALS AND AN ARRANGEMENT FOR CARRYING OUT THE METHOD

[72] Inventors: Ulf Robert Oscarson Lindback, Tyreso; Herman Josef Burghardt Vollmer, Vendelso, both of Sweden

[73] Assignee: Telefonaktiebolaget LM Ericsson, Stockholm, Sweden

[22] Filed: Mar. 13, 1970

[21] Appl. No.: 19,310

[30] Foreign Application Priority Data

Mar. 26, 1969 Sweden ..................................4248/69

[52] U.S. Cl. .......................................178/69.5 R, 179/15 BS

[51] Int. Cl. ..........................................H04j 3/06, H04l 7/08

[58] Field of Search ....................179/15 BA, 15 BS, 15.55 R, 179/15.55 T; 178/69.5 R, 69.5 F

[56] References Cited

UNITED STATES PATENTS 3,069,504 12/1962 Kaneko ..............................179/15 BS 3,404,231 10/1968 Aaron et al. .......................178/69.5 R 3,550,082 12/1970 Tong.................................178/69.5 R

*Primary Examiner*—Robert L. Griffin

*Assistant Examiner*—John C. Martin

*Attorney*—Hane & Baxley

[57] ABSTRACT

The invention relates to a method and an arrangement for synchronizing blocks of digital signals transferring information from a transmitter to a receiver. A cyclically repeated counting process the greatest value of which corresponds to the number of bits in the block controls a parallel-series conversion on the transmitter side and a series-parallel conversion on the receiver side. A cyclically generated synchronizing word formed of ones and zeros is logically superposed on the digital signal on the transmitter side and on the receiver side the same synchronizing word is again logically superposed on the combined signals in order to restore the original digital signal. During intervals occurring necessarily in continuous speech the synchronizing word appears alone and is identified and the number of its occurrence is counted. After a definite number occurrences of the synchronizing word a control pulse is generated which starts the cyclically repeated counting process on the receiver side.

8 Claims, 2 Drawing Figures

INVENTORS
Ulf Robert Oscarson Lindbäck
Herman Josef Burghardt Vollmer

BY Hane and Baxley
ATTORNEYS

INVENTORS
Ulf Robert Oscarson Lindbäck
Herman Josef Burghardt Vollmer
BY Hane and Baxley
ATTORNEYS

METHOD FOR SYNCHRONIZING DIGITAL SIGNALS AND AN ARRANGEMENT FOR CARRYING OUT THE METHOD

The present invention relates to a method and an arrangement for synchronizing blocks of digital signals upon transferring of information from a transmitter to a receiver. In the method a cyclically repeated counting process, the greatest value of which corresponds to the number of bits in the block and which counting process controls a parallel-series conversion on the transmitter side and a series-parallel conversion on the receiver side, is started on the transmitter side and on the receiver side simultaneously.

When transferring a block of digital signals for example vocoder signals in telecommunication systems, two synchronizing conditions must be fulfilled. On the one hand, a bit synchronization has to be carried out, i.e., the binary signals should be in synchronism with each other on the transmitter side as well as on the receiver side. On the other hand also a block synchronization must be carried out, in other words, synchronism has to exist between the signals occurring during one and the same signal scanning, the so-called block. The bit synchronization is secured in the data transmission equipment and is not dealt with in this connection. The block synchronization, however, has to take place in the terminal equipment and must be reliable both for four-wire connections and for two-wire connections. In a four-wire connection an acknowledgement of the synchronization can easily be achieved by using a closed loop. However, in two-wire connections a back signalling channel is required in the data transmission equipment for acknowledging the synchronization. This demand can cause difficulties in bad transmission connections besides the fact that it also necessitates special data modems.

An object of the invention is to provide a method for block synchronization by means of which said extra equipment is saved and the synchronization can be made by means of a common two-wire connection and an arrangement for carrying out the method.

The method is based on the fact that intervals in the transmitted signals (continuous speech contains for example at least 30 percent intervals exceeding 30 ms.) can be utilized for recognizing a synchronizing signal continuously logically superposed on the digital signals. The method according to the invention is defined in the characterizing part of the invention.

Figure 1:
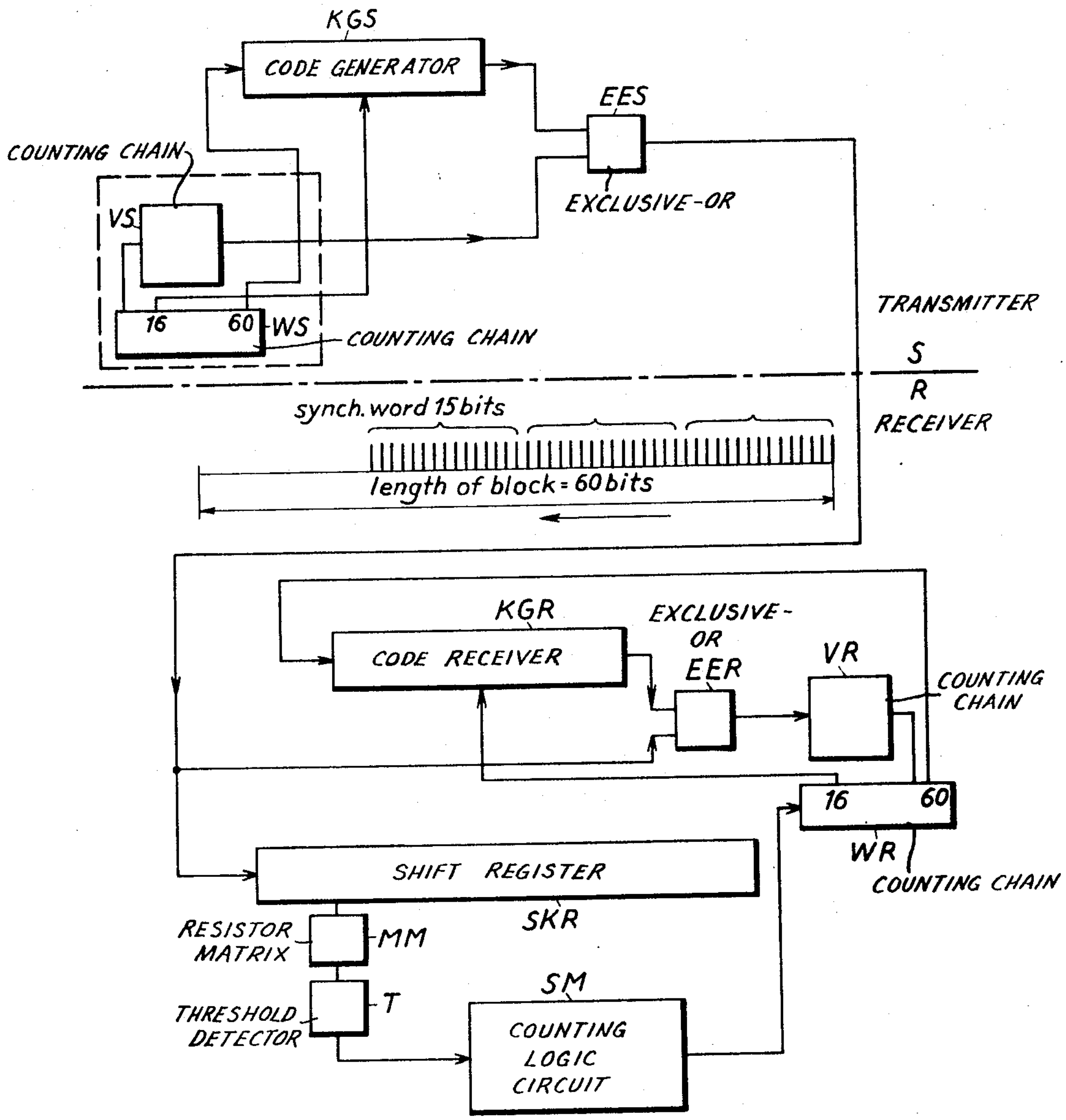
Figure 2:
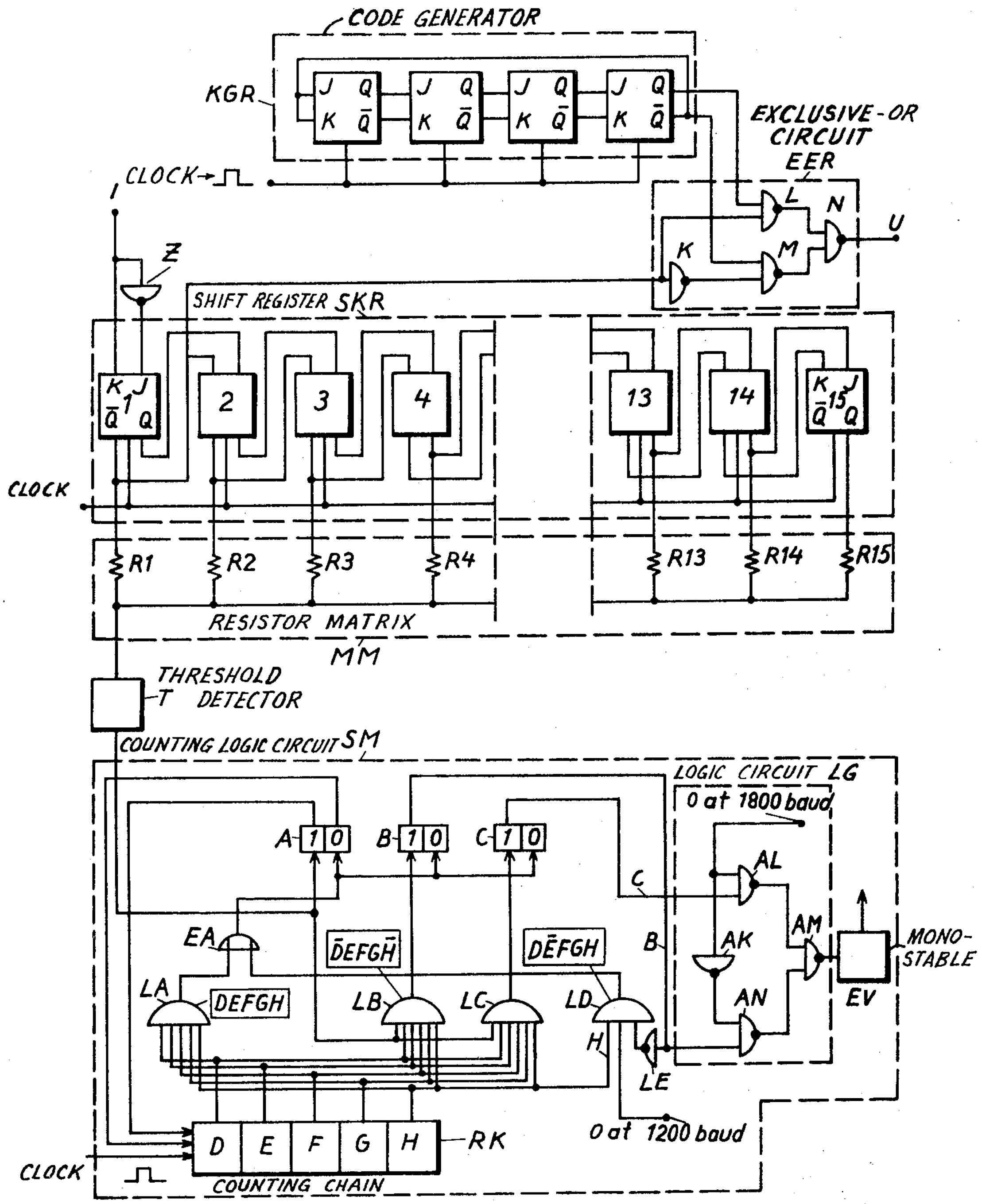

The invention will be described more closely by means of an embodiment with reference to the accompanying drawing on which FIG. 1 shows in the form of a block diagram a system for transmitting vocoder signals, in which the block synchronization according to the invention has been applied and FIG. 2 is a more detailed diagram of the receiving part of the synchronizing arrangement.

In FIG. 1, S indicates the transmitter part and R the receiver part in a vocoder system which can be of known type, for example a system described in the Swedish patent 222,990. In this known arrangement, blocks of 60 bits are transferred, containing parameters to be able to reconstruct on the receiver side a number of amplitude values in the speech spectrum, scanned at the same time on the transmitter side. Counting chains WS and WR are arranged on the transmitter side as well as on the receiver side which chains are stepped forward simultaneously in order to activate simultaneously and sequentially circuits corresponding to each other, on the transmitter side and on the receiver side. These counting chains have to be in synchronism with each other in order to allow the binary values incoming serially to be supplied to their respective circuits as otherwise the original signal cannot be restored. In other words, the counting chains must start simultaneously.

The digitalized vocoder signals are combined according to the invention in an EXCLUSIVE-OR-circuit EES, with a series of binary pulses obtained from a code generator KGS. This last mentioned generator generates a cyclically repeated pulse train, herebelow called a synchronizing word, comprising a number of ones and zeros in such a combination as to decrease the probability that a corresponding series of bits can appear at random in the vocoder signals.

The code generator can be a counting chain known per se, consisting of for example so-called J–K bistable circuits. According to the example for synchronizing word consists of 15 bits forming the pattern 000010101100111 but also an arbitrary other pattern can be chosen by a suitable connection of the stages of the counting chain as it will be described later on. According to the example the transmitting of the synchronizing word is not started simultaneously with the beginning of a block but only after the 15th bit of the block has been sent, due to a certain insecurity in the first bits in the beginning of each block. This is symbolized in FIG. 1 with the connection between output number 16 of the counting chain WS and a starting input of the code generator KGS. When the counting chain WS has attained its end value, for example 60, and is set to 0, the code generator is set to 0 simultaneously and it starts again when the counting chain has reached the position 16.

The combined digital signal is transmitted from the transmitter S to the receiver R and is converted into the original digital vocoder signals by generating in a code generator KGR which is of the same type as the code generator KGS, the same pulse train as on the transmitter side and by carrying out a further EXCLUSIVE-OR-operation in the EXCLUSIVE-OR-circuit EER. The code generator KGR is controlled in the same way by the counting chain WR of the receiver as the code generator KGS is controlled by the counting chain WS, in other words, it is started in the 16th bit position and is set to zero in the 60th bit position. During the first 15 bits when the synchronizing word does not appear either on the transmitter side or on the receiver side the EXCLUSIVE-OR-operation, of course, leads to no change in the digital signals.

The condition for restoring the vocoder signals on the receiver side is that the counting chains WS and WR are set simultaneously to zero and consequently also the synchronizing words appear synchronously. This is carried out according to the invention by the generation of a signal that 1-sets the counting chain WR of the receiver when a determined number of synchronizing words, in the case of for example a block of 60 bits, three synchronizing words, have been received, i.e., between the 16th and the 60th bit. When the data rate is 1,800 baud and 46 bit/sampling, the synchronizing word is sent twice in succession between the 16th and the 46th bit of the block and the condition for the zero setting of the counting chain WR is that the synchronizing word is recognized twice in succession. When the data rate is 1,200 baud and 30 bit/sampling the synchronizing word is sent once between bit 16 and bit 30 and the condition for the 0-setting signal is that the synchronizing word is recognized twice with an interval of 15 bits between the words. The function of the arrangement will be described in using the above mentioned data rates and with 15 bit synchronizing words but it is obvious that arbitrary suitable block lengths with a suitable length of synchronizing word selected in correspondence to these, can be used.

As was mentioned by way of introduction it can be taken for granted that continuous speech contains at least 30 percent intervals exceeding 30 ms. Thus during these intervals only the code pulses are received, and no vocoder signal. The receiver contains a shift register SKR to which the signals obtained from the transmitter are supplied in series form independently of whether they consist of the vocoder signal alone, the vocoder signal combined with the synchronizing code or of the synchronizing code alone. The shift register SKR contains 15 stages and it is easy to see that during a speech interval it can occur several times in succession that the synchronizing work is recorded in the shift register. The shift register is connected to a threshold detector T via a resistor matrix MM built up in such a way that the threshold detector is activated each time the shift register contains the synchronizing word as will be described in connection with FIG. 2. SM indicates a counting logical circuit that upon activation of the threshold detector T obtains an activating signal and counts how many times the synchronizing word has been received. If the logical circuit has determined that the number of synchronizing words (for example two or three), selected for the respective data transmission rate has been received, it sends a 0-setting signal to the counting chain WR as a sign that a new block is to be started and consequently the counting is to be started from the 0-position. When the counting chain WR has reached the position 16, the code generator KGR receives a starting signal and generates the pulse train corresponding to the synchronizing word, until it is stopped upon the 0 setting of the counting chain WR.

FIG. 2 shows the receiver part of the synchronizing arrangement more in detail. The code generator KGR which is identical with the code generator KGS of the transmitter, consists of a shift register built up of four so-called J–K-circuits, each having two inputs J and K and two outputs, one 1-output Q and one O-output Q. The Q-output of each stage is connected to the J-input of the following stage and the Q-output of each stage is connected to the K-input of the following stage while the Q-output of the last stage is reconnected to both outputs J and K in the first stage. All stages are supplied parallelly by clock pulses as is well-known in J–K-circuits:

- when the J-input receives a 1-signal and the K-input a 0-signal, the circuit takes the position 1 or maintains the position 1, i.e., the output Q has a 1-signal and the output Q has a 0-signal.
- when the J-input receives a 0-signal and the K-input a 1-signal, the circuit takes the position 0 or maintains the position 0, i.e., the output Q has a 0-signal and the output Q has a 1-signal.
- when both inputs J and K receive a 0-signal, the circuit maintains its position upon reception of the clock pulse and finally
- when both inputs J and K receive a 1-signal, the circuit changes condition upon each received clock pulse.

It is easy to see that by interconnecting the stages of the shift register in the way indicated in FIG. 2, a pulse train of the form 000010100110111 with the repeating frequency 15 will be obtained from the Q-output of the last stage.

The EXCLUSIVE-OR-circuit EER that is identical with the circuit EES is built up of four NAND-circuits K,L,M and N in a known manner and is supplied on the one hand by the received combined signal, and on the other hand by the signal from both the Q-output and the Q-output of the last stage of the shift register KGR. Thus in the rest position of the shift register there is obtained on the output of the circuit EER the received vocoder signal directly or when the shift register is in function, the decoded original vocoder signal.

The shift register SKR is in the same way as the shift register KGR built up of J–K bistable circuits as it is indicated in FIG. 2 but it has 15 stages to be able to store a synchronizing word. The received vocoder signals are supplied to the inputs J and K of the first stage of the shift register, to the input J directly and to the input K via an inverting circuit Z, so that upon appearance of the clock pulse the bistable circuit occupies a condition corresponding to the binary signal received. Simultaneously the binary information is transferred from each stage to the following stage, so that during a speech interval after a number of clock pulses the binary information in the bistable circuits will correspond to the synchronizing word.

The resistor matrix MM consists of 15 resistors R1–R15 which are parallelly connected to a 1-output or a 0-output of all binary stages which outputs are selected in such a way that when the synchronizing word is recorded in the shift register, all resistors are connected to the same voltage of definite value, in consequence which the voltage drop of the connecting point of the resistors becomes lowest, in other word, a voltage is obtained exceeding a definite limit value.

In FIG. 2, for the sake of simplicity, only the first four and the last three stages of the shift register and the resistors R1–R4 and R13–R15 respectively belonging to them, are shown but it appears that, in correspondence to the word pattern 000010100110111, R1–R3 are connected to the 1-output of their respective stages, R4 to the 0-output and R13–R14 to the 0-output. A certain fault margin upon scanning of the synchronous word may be allowed, for example approximately 7 percent which implies that the prescribed voltage limit at the connecting point of the resistors is reached when the condition in 14 stages corresponds to the condition existing when the synchronizing word is recorded.

When reaching the prescribed voltage value in the connecting point of the resistors, a threshold detector T will be activated and delivers an activating pulse to the counting logic SM the purpose of which is to count the number of received synchronizing words. Upon obtaining the first activating pulse, a bistable circuit A is 1-set in a group of bistable circuits consisting of three bistable circuits. In consequence of this counter RK is started in the counting logical circuit which counter has five binary counting stages, D,E, F,G and H and is stepped forward with the clock pulses. The outputs from the counting stages are connected to a number of AND-circuits LA,LB,LC and LD. The continued function of the arrangement is explained in connection with the synchronizing of vocoder signals at three different data transmission velocities.

2,400 BAUD AND A BLOCK LENGTH OF 60 BITS

When the counter RK has been stepped to the position 01110, the AND-circuit LB is activated the inputs of which are formed by the outputs of the stages of the counter in case a further condition for activation is fulfilled, viz. that a new activating signal is obtained from the threshold detector. This is a sign that the synchronizing word has been obtained for the second time and the output signal from gate LB 1-sets the bistable circuit B. The counting continues and when the counter RK reaches the position 30, the word 11101 will be obtained which is one of the conditions for activation of the AND-circuit LC the inputs of which are connected to the stages of the counter. A second condition is that also an activating signal from the threshold detector T appears simultaneously as a sign that the synchronizing word has been obtained for the third time. The output signal from the AND-circuit LC 1-sets the bistable circuit C, in consequence of which a control signal is fed via the logic circuit LG to a monostable circuit EV. The bistable circuit delivers a 0-setting pulse to the counting chain WR (not shown in FIG. 2) so that this starts its counting period of 60 bits. When the counter RK has reached the position 32, i.e., 11111, the bistable circuits A,B and C are set to 0 via the AND-circuit LA the inputs of which are connected to the counter RK and via the OR-circuit EA and by the 0-setting of the bistable circuit A the counter RK is stopped in its 0-position.

If only two synchronizing words have been received and no third word has arrived, no signal from the output of the AND-circuit LC will be obtained and the bistable circuit C1 is not 1-set. Consequently the monostable circuit EV is not activated and the bistable circuits A and B are set to 0 when the counter RK has reached position 32, in consequence of which the counter is stopped in its 0-position.

If only one synchronizing word is obtained, the difference will be that the AND-circuit LB cannot be opened as it does not obtain the activating signal from the threshold detector, corresponding to the other synchronizing word. When after two further counting stages the counter reaches the position 17, i.e., 10000, the AND-circuit LD will be activated on the one hand by the signal from stage H, on the other hand by the signal corresponding to the 0-condition of the corresponding bistable circuit B (through the inverting circuit LE) and through the OR-circuit EA the bistable circuit A is set to 0 as in the preceding case.

1,800 BAUD AND A BLOCK LENGTH OF 46 BITS

In his case the synchronizing word is to be identified twice in succession. Until the counter RK has been stepped to the position 15, the function is the same as has been described before. Now, however, due to the switching to 1,800 baud, the input of the inverting circuit AK in the logic LG is activated, so that when receiving the other signal from T, the bistable circuit B is 1-set, the monostable circuit EV is activated via the NAND-circuits AN and AM and the counting chain RW is set to 0. When the counter RK reaches the position 32, 0-setting will take place as in the case described above.

If only one synchronizing word is obtained, the process will be exactly the same as has been described in conjunction with 2,400 baud.

1,200 BAUD AND A BLOCK LENGTH OF 30 BITS

In this case the synchronizing word is to be identified twice with an interval of 15 bits between the words. The starting of the counter RK occurs by means of the first signal from the threshold detector T in the same way as in the preceding cases. As a new synchronizing word has not been sent, the bistable circuit B cannot be 1-set by the signal from the threshold detector T. When the counter reaches the position 17, the 0-setting of the bistable circuit A is prevented because the third input of the AND-circuit LD does not receive any signal and the output is not activated. The counter continues to count and when position 30 has been reached, the gate LC is opened, the bistable circuit C is 1-set and the monostable circuit EV is activated. When the counter has reached the position 32, the 0-setting of the bistable circuit A and of the counter takes place.

If only one word is obtained, i.e., when the counter has reached position 30, no signal is obtained from the threshold detector T, the condition of the bistable circuit C is not altered and the monostable circuit EV is not activated. Resetting takes place in position 32 of the counter as before.

The invention is of course not limited to a vocoder system according to the embodiment but can be used in any system for transmitting digital signals.

What is claimed is:

1. In a digital data transmission system for intermittently transferring data blocks each having the same number of bits from a transmitter to a receiver wherein each bit position of the block is determined by cyclically repeated independent counting at the transmitter and receiver to a number equal to the number of bits in a block, the method of intrablock bit position synchronization comprising the steps of generating at both the transmitter and the receiver at least once per block period the same given predetermined synchronizing word having a number of bits such that twice the number of bits in the synchronizing word is no greater than the number of bits in a block, at the transmitter continuously transmitting to said receiver said synchronizing words at least once during each block period and, whenever a block is transmitted, logically superimposing the then being transmitted synchronizing words on the block so that said receiver receives either synchronizing words alone or blocks with synchronizing words logically superimposed thereon, at the receiver receiving all the transmitted data from the transmitter and logically superimposing on at least the blocks having logically superimposed thereon synchronizing words, the synchronizing words generated at the receiver, continuously shift-through sampling in the received data stream a number of successive bits, said number being the number of bit positions in a synchronizing word, generating an activating signal whenever the sampled bits have the representation of the synchronizing word, counting said activating signals and initiating the cyclically repeated counting at the receiver when a predetermined number of activating signals have been counted.

2. The method of claim 1 wherein the first bit positions of said blocks and said synchronizing words are coincident.

3. The method of claim 1 wherein the first bit position of synchronizing word and the *n*th (where *n* equals the number of bits in a synchronizing word) bit position of a block are coincident.

4. The method of claim 1 wherein there are *n* bit positions in a synchronizing word and 2*n* bit positions in a block, and said cyclically repeated counting is initiated when two activating signals have been counted.

5. A data transmission system comprising: at the transmitter side a transmitter means for converting analogue signals into digital signals, a counting circuit means for controlling the transmission of the digital signals in block form with the beginning position determining the sending out of the first bit of the block, a code generator means for generating synchronizing words in a cyclically repeated sequence with the start being controlled from a determined output of said counting circuit means, and a coding means for logically superposing the synchronizing word on the digital signals; and at the receiver side a receiver, a counting circuit means for controlling the receiving of the blocks by said receiver, the beginning position of said counting circuit means corresponding to the first bit of the block, a coder generator means for generating the synchronizing word in a cyclically repeated sequence with the start being controlled from a determined output of said counting circuit means, and a decoding means for logically superposing the synchronizing word on the received blocks signal in order to restore the original digital signal, a shift register for continuously storing a number of digital signals received in series form, a comparison means for comparing the sum of a number of signals obtained from each of the register stages with a determined value corresponding to the sum of said signals when the register contains the synchronizing word and upon conformity delivering an activating signal, and a counting logical circuit which counts said activating signals and upon attaining the number corresponding to the number of synchronizing words belonging to the block, generates a control pulse supplied to said counting circuit means in order to set the latter to a start position.

6. The data transmission system of claim 5 wherein comparison means comprises a resistor network with a number of parallel branches connected individually to outputs of said register stages in such a way that when the register stages are set to the condition corresponding to the bits of the synchronizing word, all branches receive current, and by a threshold detector which is connected to the connecting point of the branches for generating an activating signal when the voltage drop through said parallel branches has its lowest value.

7. The data transmission system of claim 5 wherein said counting logical circuit includes a counter which is stepped concurrently with the bits of the digital signal, a register consisting of bistable stages settable to different states and a logical circuit means for transmitting a signal to said register every time said counter reaches a value which is a multiple of the length of the synchronizing word, said register including means for changing state upon the coincident reception of signals from said logical circuit means and said comparison means, said counting logical circuit further including a pulse generating circuit connectable to one of said register stages for feeding a control signal to said counting circuit when said register stage is activated.

8. The data transmission system of claim 7 wherein said counting logical circuit further comprises a blocking circuit adjustable to connect said pulse generating circuit to a selected register stage.

* * * * *